March 3, 1953     C. R. FOUTZ     2,630,183
APPARATUS FOR FORMING AND PROJECTING A FOAM MIXTURE
Filed Jan. 26, 1950     3 Sheets-Sheet 1
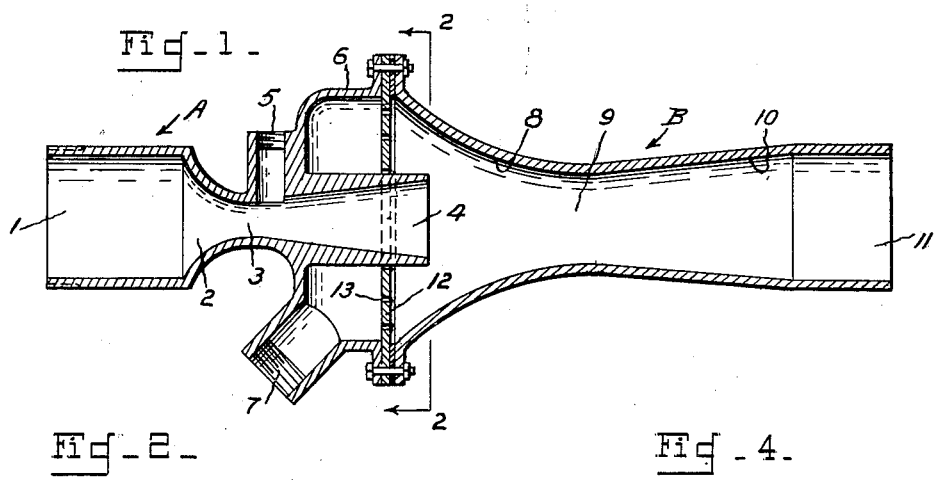
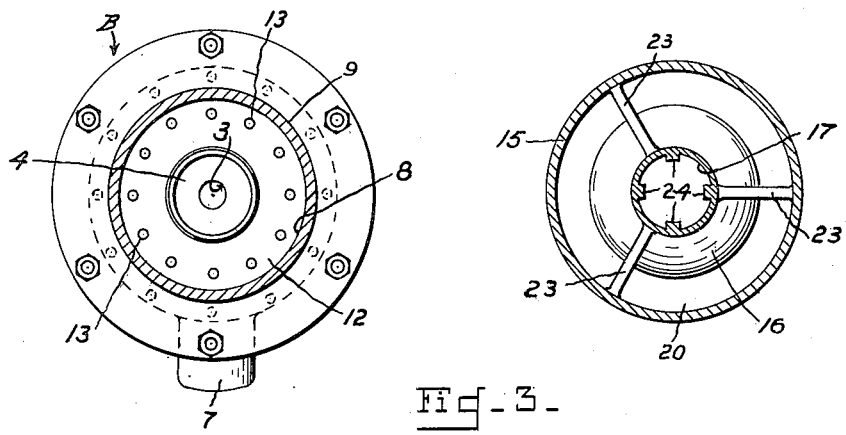
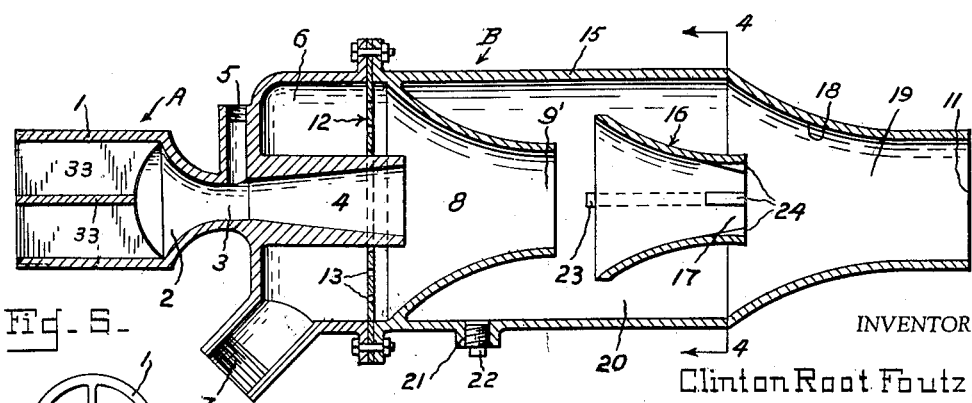
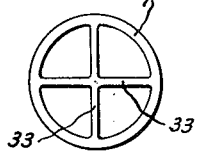
INVENTOR
Clinton Root Foutz,
BY
ATTORNEY

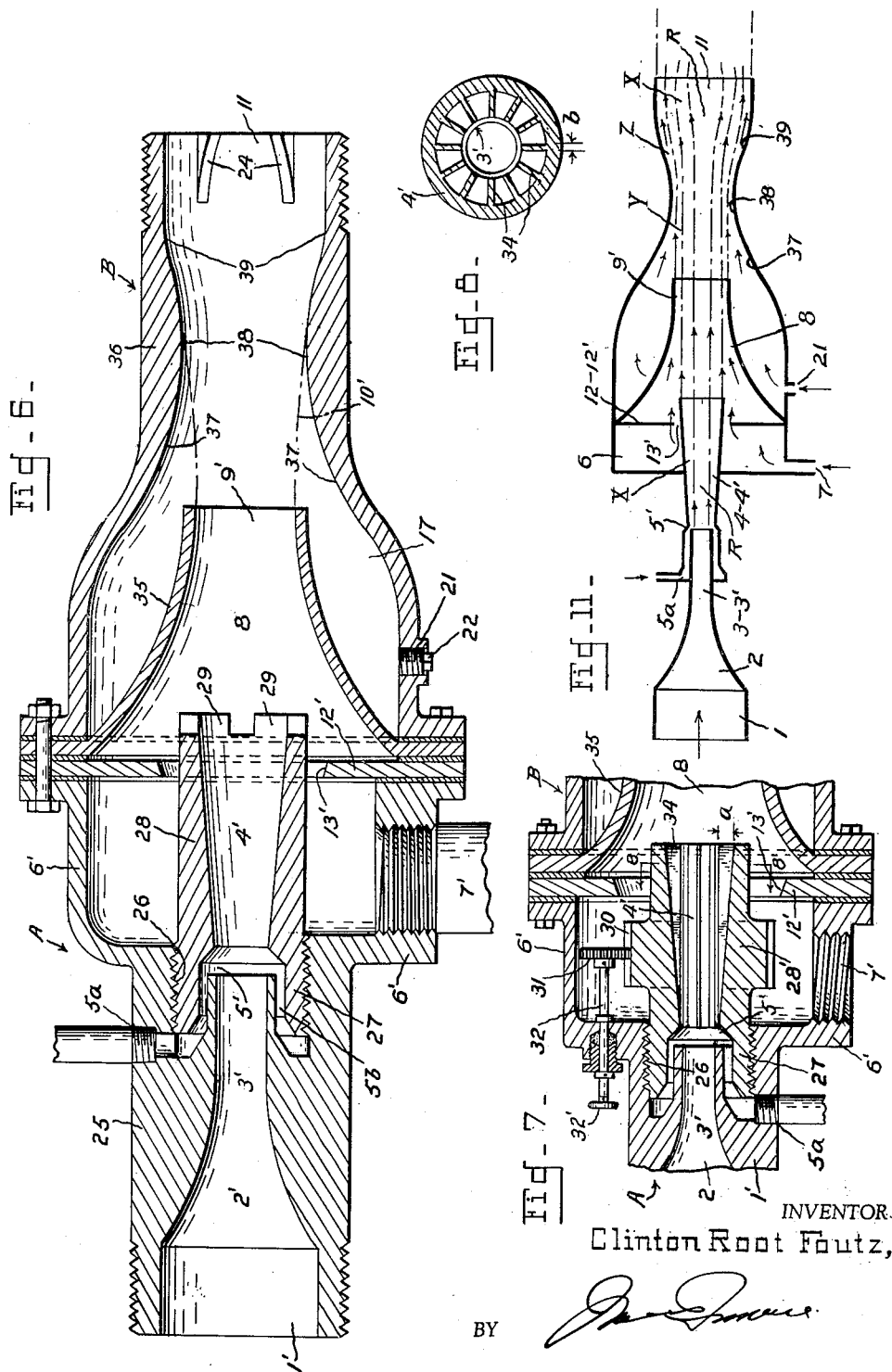

March 3, 1953 — C. R. FOUTZ — 2,630,183
APPARATUS FOR FORMING AND PROJECTING A FOAM MIXTURE
Filed Jan. 26, 1950 — 3 Sheets-Sheet 3
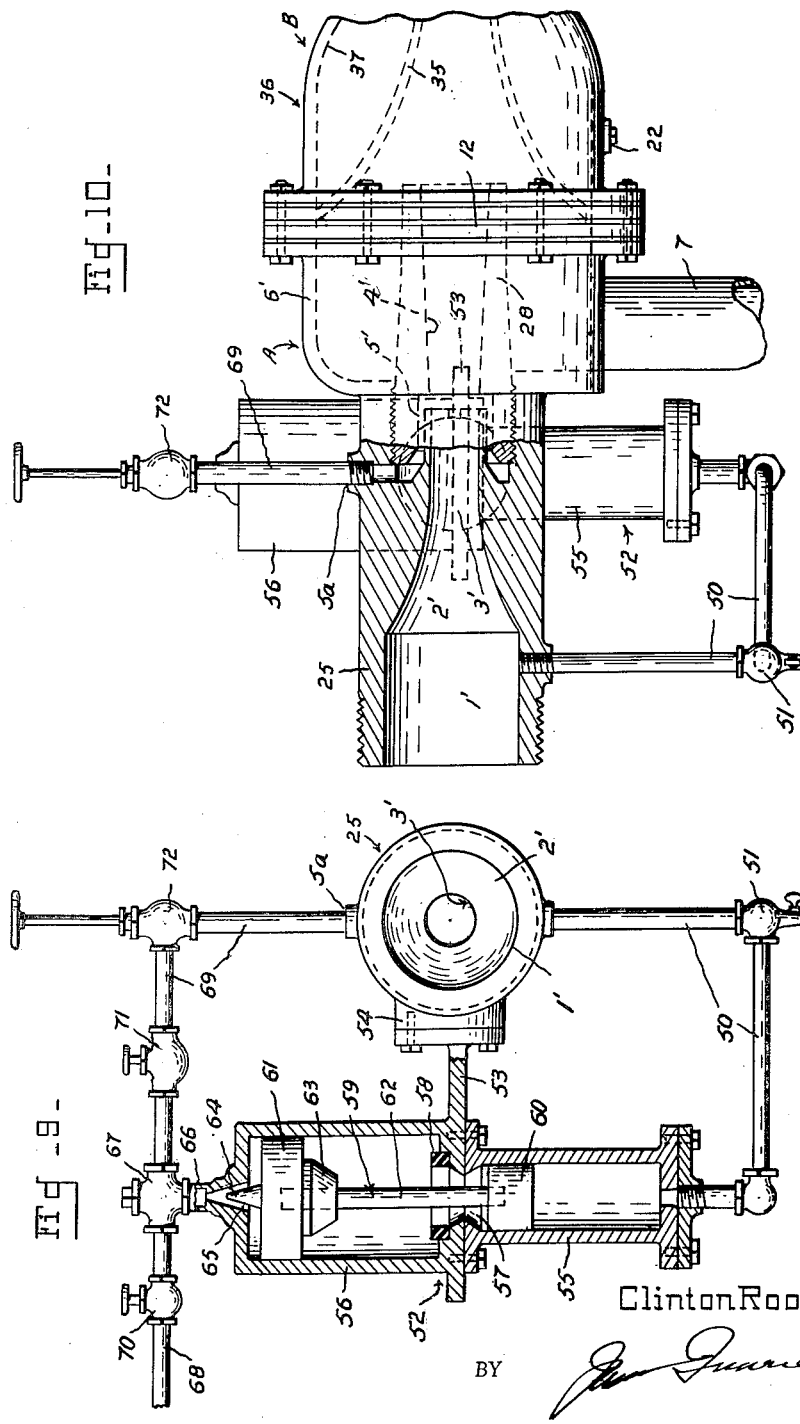
INVENTOR
Clinton Root Foutz
BY
ATTORNEY Patented Mar. 3, 1953

2,630,183

UNITED STATES PATENT OFFICE 2,630,183

APPARATUS FOR FORMING AND PROJECTING A FOAM MIXTURE

Clinton Root Foutz, Washington, D. C.

Application January 26, 1950, Serial No. 140,625

9 Claims. (Cl. 169—15)

This invention relates to a method and apparatus for forming and projecting a foam mixture, particularly for use with fire-fighting apparatus. This application is a continuation-in-part of application Serial No. 782,592, filed October 28, 1947, now abandoned.

The use of a foam for smothering and extinguishing fires is well known, but this use has been limited in application due to the fact that known foam-forming methods and apparatus are incapable of projecting the foam. According to these prior art methods and devices, the foam-forming ingredients, usually water, air and foam-forming liquid such as liquid soap, are all inter-mixed under pressure with a high degree of turbulence to form the foam which is fed out by the pressure in the mixing chamber. Furthermore, the use of air in the foam is unsatisfactory due to the expansion and breaking of the foam bubbles which provide oxygen right at the burning surface to feed the flames. Consequently, the foam merely flows from the apparatus and must be applied directly to the burning surface and this defect, despite the use of asbestos suits and other protective devices, limits the use of foam to relatively small conflagrations.

Having in mind the defects of the prior art methods and apparatus, it is an object of the present invention to provide a method of and an apparatus for producing a foam mixture that may be projected in the same manner as a liquid; that produces a foam from a mixture without mechanical turbulence but solely by natural forces through dispersion and homogeneity due to different thermal and physical characteristics such as density, viscosity and adhesion; that provides a foam that will adhere to and smother a burning surface; and that has simplicity of design, economy of construction and efficiency in operation.

The foregoing objects and others ancillary thereto are preferably accomplished by the production of a concentrically laminar rod of fluid mixtures having a core of water under axial pressure with cylindrical lamina of the other ingredients. In a fire-fighting foam, this laminar rod will comprise at least a core of water projected under pressure, a surrounding sleeve of foam liquid such as liquid soap, and an outer sleeve of a hot gas which is devoid of free oxygen. This laminar fluid rod is capable of being projected and forms, through natural forces, a homogeneous colloidal foam mixture wherein the bubble-entrapped gas will not feed the fire and, in addition, will contract, rather than expand, and thereby increase the surface tension of the bubbles.

This laminar fluid rod is most conveniently produced by an apparatus, in accordance with the present invention, which comprises at least two axially disposed veni-contracta throats, the second throat being slightly larger than the first and each having an auxiliary inlet. When water is pumped through this apparatus at sufficient pressure and velocity, it creates a vacuum at the auxiliary inlets to draw in other fluids, such as a foam-forming liquid through the inlet of the first throat and gas through the inlet of the second throat.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Fig. 1 is a view in cross-section taken longitudinally through a basic form of the device in accordance with the present invention;

Fig. 2 is a view in cross-section taken on line 2—2 of Fig. 1;

Fig. 3 is a view in cross-section taken longitudinally through a modified form of the device;

Fig. 4 is a view in cross-section taken on line 4—4 of Fig. 3;

Fig. 5 is an end view of the inlet end of the modification shown in Fig. 3;

Fig. 6 is a view in cross-section taken longitudinally through a preferred modification and commerical adaptation of the device;

Fig. 7 is a fragmentary view in cross-section taken longitudinally of a device incorporating a modification of the device shown in Fig. 5;

Fig. 8 is a view in cross-section taken on line 8—8 of Fig. 7;

Fig. 9 is an inlet end view of the device with a self-powered foam liquid injector operatively coupled thereto and shown in cross-section;

Fig. 10 is a side view of the device and injector shown in Fig. 9, with the inlet end of the device in cross-section; and Fig. 11 is a diagrammatic cross-sectional view of the device in operation and illustrating the method for forming the assembly of fluids.

Referring now to the drawings, specifically to

Fig. 1, a device incorporating a basic construction in accordance with the present invention, comprises an upstream veni-contracta A and a downstream veni-contracta B, each conveniently formed as a separate member or casting and rigidly secured together. The veni-contracta A comprises a Venturi tube having an upstream cone 2 open to an inlet 1 and contracting to a throat 3 which opens into a downstream cone 4. An auxiliary inlet 5 opens into the Venturi tube substantially between the throat 3 and downstream cone 4, and an annular shell or casing 6 surrounds the downstream cone 4 and has an inlet 7. The veni-contracta B comprises a closed Venturi tube having an upstream cone 8 open to and secured at its leading edge to the casing 6 and contracting to a throat 9 which opens into a downstream cone 10 that expands to an outlet 11. An annular baffle plate 12, having openings 13, in the present instance, is sandwiched between the casing 6 and the upstream cone 8 to circumferentially distribute flow from the inlet 7, around the chamber formed by the casing 6 and to the cone 8.

In operation, briefly the device may be connected with the inlet 1 open to a supply of fluid under pressure, such for instance as water. Sources of other fluids, not necessarily under pressure, are connected respectively with the inlets 5 and 7. When the water supply is first opened, the water flows into the inlet and fills completely both of the veni-contractas A and B, displacing all air therefrom, after which the water pressure is increased so that the water is constricted by the throat 3 and projects therefrom as a solid rod-like stream of water, the pressure of the water causing the sides of the stream to fall away from the walls of the downstream cone 4, in which a very low absolute pressure is created through the inlet 5. The second fluid is then drawn through the inlet 5 and surrounds the rod of water. Substantially the same action occurs in the veni-contracta B. The fluid rod of water surrounded by the second fluid streams from the cone 4 through the throat 9, lowering the absolute pressure there, leaves the converging walls of the downstream cone 10, thereby causing a suction through the upstream cone 8, chamber 6 and inlet 7, drawing in a third fluid which is circumferentially spread by the baffle 12 to surround the fluid rod as a second cylindrical lamination. Preferably, at least two of the fluids differ in characteristics of travel speed, viscosity, density and the like, so that as they project from the veni-contracta B, there is an interaction between the core and adjacent laminations that eventually results in a homogeneous stream, without decreasing the force of the stream as occurs by induced mechanical turbulence.

The basic device, as shown in Fig. 1, may be modified in various ways to accommodate the inclusion of additional laminations to the fluid rod, an increase of agitation of the fluid, or adjustment of the device to vary the intake of fluids. One modification is shown in Fig. 3 wherein the veni-contracta A is substantially identical to that previously described but the veni-contracta B is somewhat modified as it comprises a housing 15 which contains the upstream cone 8 contracting to a terminal throat 9'. A second upstream cone 16 is spaced from throat 9' and contracts to a terminal throat 17. The housing 15 terminates in an upstream cone 18 which contracts to a throat 19 that terminates in the outlet 11. The housing 15 defines a chamber 20 with which the cones 16 and 18 are in communication. An inlet 21 is provided in the housing 15 and opens into the chamber 20 so that a fourth fluid may be drawn in by the low pressure differential created by the fluid rod passing through the cones 16 and 18, thus forming a third double layer cylindrical lamina around the fluid rod. If this fourth fluid is not desired, the inlet 21 may be closed by a plug 22.

The cone 16 may be axially supported by spokes 23 extending to the housing 15. The mixing of the laminar fluid rod may be expedited, if desired, by providing one of the throats, the throat 17 in this instance, with inwardly curved projections 24 which will deflect portions of the fluid rod and instigate streamline dispersion without turbulence so that the force of the stream is not materially reduced. Furthermore, diametrical or other longitudinally extending vanes 33 may be mounted in the inlet 1 to streamline the flow of the water and baffle any turbulence that may be caused by a butterfly or like valve that is only partially open.

Another modification, and the preferred form of the device, is shown in Fig. 6. In this form, the veni-contracta A comprises two parts, the primary member 25 including the main inlet 1, upstream cone 2, throat 3', and casing 6. This part 25 has an internally threaded annular recess 26 surrounding the elongated downstream end of the throat 3' for the reception of a threaded annular extension 27 of the secondary member 28 which contains the downstream cone 4'. An inlet 5a extends through the primary member 25 and opens into the inner end of the recess 26, and the inner annular wall of the recess 26 and inner wall of the annulus 28 are radially spaced to define a through annular passage 5b from the inlet 5a to an annular discharge opening 5' between the throat 3' and the cone 4'.

The downstream end of the secondary member 28 is rotatable and provided with lugs 29 for cooperation with a suitable tool insertable axially through the veni-contracta B to thread the annulus 27 relative to the recess 26 for adjusting the opening 5' to regulate flow therethrough. Obviously, this operation is limited to an initial adjustment before each operation and if adjustment during operation is desired, a more expensive construction may be employed such, for example, as that shown in Fig. 7.

According to the arrangement shown in Fig. 7, the secondary member 28' is surrounded by a spur gear 30, in mesh with a pinion 31 which is fixed on a shaft 32 that is journalled in and extends through the annular casing 6' and carries a hand knob 32' at its outer end. By manual adjustment of the knob 32', the pinion 31 will rotate the spur gear 30 and thread the annulus 27 relative to the recess 26 and thereby adjust the annular opening 5'. Preferably, the spur gear 30 is fixed to the member 28' and is relatively wide to accommodate axial movement with respect to the pinion 31.

The baffle plate 12' is preferably modified to comprise a solid plate having an inner edge that is spaced from the outer surface of the member 28 to define an annular passage 13'. As the plate 12' is removably sandwiched between the veni-contractas A and B, it may be replaced to provide a passage 13' of desired dimensions. The annular passage 13' is preferred as it is operative to form the fluid passing therethrough in a cylindrical mass rather than in a plurality of individual streams as produced by the apertures 13 in the perforated plate 12.

The veni-contracta B also comprises two parts, an inner member 35, which defines the upstream cone 8 and terminal throat 9', and an outer member 36 which comprises a Venturi-like tube having an upstream cone 37, throat 38 and downstream cone 39 which opens to the outlet 11. If desired, the inwardly curved projections 24 may be provided in the member 36, and in addition the upstream cone 37 may be provided with an inlet 21 for the admission of another fluid or as a drain for residual liquid and closed by a plug 22 as hereinbefore described with relation to the modification shown in Fig. 3. It will be noted that the dimensions of the throat 38 and downstream cone 39 are in such relation to the throat 9' as to define a phantom downstream cone 10' for the throat 9'.

A further modification is illustrated in Figs. 7 and 8, wherein it will be seen that the downstream cone 4—4' is provided with a plurality of fins 34 which are in parallel with each other at their inner faces, that is the inner faces are cylindrical or tangent to the cylinder of the water rod forward streamline flow. The height $a$, of the downstream ends of the fins, is equal to the sine of the angle of the downstream necessary divergence of about 3°— and the width $b$ is made as small as possible considering the structural strength necessary. The purpose of the fins 34 is twofold: First, to increase the inside surface area of the cone 4 to which the water first and then the foam-forming liquid may adhere; and, second, to control and secure better envelopment by the foam-forming liquid around and over the circumferential surface of the water column.

As previously stated, when initially starting the use of the device, the water should be admitted under low pressure in order to completely fill the downstream cone 4—4' and drive all of the air therefrom, after which the pressure is increased to cause the water to project from the throat 3—3' in a rod-like stream. As the pressure is increased and the water draws away from the diverging walls of the cone 4—4' it creates a vacuum or a lower differential pressure and sucks the foam liquid in through the inlet 5—5'.

In practice, however, it has been found that the tendency is to turn the water on full force, or at least at too high a pressure, so that the veni-contracta A acts as a nozzle and the water is immediately projected through the cone 4—4' in a rod-like stream so that the air is not displaced therefrom. Consequently, no suction is created in the auxiliary inlet 5—5', and the foam liquid is not drawn into the inlet but, if anything, is forced back by the increased air pressure. In this event, the water pressure must be reduced and the operation started all over again.

The foregoing difficulty may be obviated and the initial starting speeded up by a self-powered foam liquid injector that is actuated by the water pressure and shown in Figs. 9 and 10. The injector may comprise a by-pass passage 50, including a drain cock 51, that opens into the inlet 1—1', to be open to the water pressure therein, and extends for communication with a double cylinder 52 that is supported by a bracket 53 mounted on a base 54 formed on the housing 25 of the veni-contracta A. The double cylinder 52 comprises a high pressure cylinder 55 and a low pressure cylinder 56, the cylinder being, preferably, axially aligned and having an opening 57 therebetween with a gasket 58 surrrounding the opening 57 on the low pressure side thereof. A double piston 59 is mounted in the double cylinder 52 and includes a high pressure piston 60 in the cylinder 55, a low pressure piston 61 in the cylinder 56 and a rod 62 extending through the opening 57 and rigidly connecting the pistons. A conical collar 63 is fixed in back of the piston 61 and around the rod 62 to cooperate with the gasket 58 in forming a tight seal when the piston 61 is retracted.

A needle valve 64 is carried by the piston 61 to cooperate with a needle valve seat 65 formed in the end of the cylinder 56 and terminating in an orifice 66 which opens into the center branch of a T connection 67. A supply line 68 is connected from a source of supply to one branch of the T 67 and a feed line 69 extends from the other branch of the T 67 for connection with the auxiliary inlet 5a of the veni-contracta A. A non-return check valve 70 is interposed in the supply line 68 to prevent return to the supply, and a non-return check valve 71 is interposed in the feed line 69 and a manually controlled valve 72 is also interposed in the feed line 69.

The by-pass 50 is connected in open communication to the inlet 1—1' and consequently to the water-gate or butterfly valve of the pump and receives the high pressure water when the water-gate is suddenly opened. Powerful vector forces thus may be set up before the angularity of the water passing out of the gate valve may be restored to parallel laminar flow before reaching the upstream throat 2—2' without which sufficient pressure drop might not be obtained to cause the foam-forming liquid to enter through the inlet 5—5', at or below atmospheric pressure. When the water-gate is jerked open and water enters the inlet 1—1', a small volume will be forced into the by-pass and flow into the high pressure cylinder 55 under the water piston 60 which is always at its lowest position and nearest to the entering water stream before every start. Likewise the low pressure piston 61 is necessarily at its lowest position, both being connected by the common piston rod 62. When in injecting position for foam-priming, the cylinder cubage in cylinder 56, above the piston, is filled with the foam-forming liquid.

When the foam liquid control valve 72 is opened, while the water is being discharged through the veni-contracta throat 2—2', the pressure of the water in the inlet 1—1' will be transmitted into the cylinder 55 and will force the water piston 60 forward or upward. This high pressure will drive the piston 61 upwardly and force the foam-liquid in the cylinder 56 above the low pressure piston 61, out of the low pressure cylinder 56, through the needle valve 64 and seat 65 out through the orifice 66 and T 67 into the foam liquid pipe line 69 through which the foam liquid is forced at any desired pressure above atmosphere into the inlet 5—5'. The non-return check valve 70 prevents the foam liquid from flowing back from the cylinder 56 into the foam liquid supply line 68 during the injection period, which may be made a short or long time, as desired, by control of the foam liquid cylinder cubage and size of the needle valve discharge orifice 66 and the relative piston areas.

The high water pressure on piston 60 pushes the piston 61 on to its needle valve seat, where it is held until the water-gate is closed, thereby restoring the pressure to atmospheric. After the low pressure piston has discharged, above atmospheric pressure, the cylinder volume of foam liquid and is held on its needle valve seat, the pressure drop in the throat 3—3', cone 4—4' and inlet 5—5' has changed to below atmospheric with sufficient pressure differential to cause the foam liquid to flow continuously thereinto. Every time and wherever the water-gate valve is closed or the pump stopped, both pistons 60 and 61 will move to their respective lower or rear end positions which will cause the foam liquid to flow into and fill the low pressure cylinder 59 with foam liquid until the piston 61 is seated on the conical seat 63 and gasket 58. The non-return check valve 71 excludes the entrance of air during the cylinder filling and entrance of water due to accidental stoppage of the colloidized stream in the hose line as could occur by a falling wall or heavy vehicle passing over the hose line behind the discharge nozzle.

The travel of piston 60 is such that at both ends there is sufficient clearance space so that the piston 61 will always seat tightly without leaking at either end of its stroke. This water pressure foam liquid priming injector is entirely automatic and discharges with the opening of the water gate if the water pressure is above the necessary maximum, and recharges with foam liquid upon the closing of the water gate. If necessary, the foam liquid may be manually supplied to the cylinder 56 by means of a plug-closed opening in the top of the T 67, having first turned off the valve 72 which is kept closed at all times until the foam liquid is needed.

The basic device has many uses, but its most advantageous use, at the present time, is in conjunction with fire-fighting apparatus for producing a colloidal foam mixture without materially affecting the velocity of the fluids so that the foam mixture may be thrown from a fire hose in much the same manner as water alone. Within its linear length the device contains the means for creating material sub-atmospheric pressure changes by creating different flow velocities in the column of water in transit through the apparatus from its inlet 1, connected to the discharge side of an internal combustion engine pump (with the gas inlet 7 connected to the engine exhaust), through the last veni-contracta throat 10—10' and its outlet 11 into the fire hose and nozzle with which the outlet end is connected.

The operation of the device is best illustrated in Fig. 11, wherein it will be seen that the upstream cone 2 of the first and true veni-contracta A is formed as a hyperboloid to contract the water to the throat 3—3' diameter without turbulence or swirling and to maintain it in streamline flow through the slightly diverging downstream cone 4—4' until a desired certain velocity is attained, when it breaks loose to form a rod R of water. Before breaking free of the cone 4—4' a vacuum is created which sucks in the second fluid, thus filling the space with a foam-forming liquid such as protein oils, soap, or mechanical foam-forming liquid. This liquid forms a cylindrical sleeve X which envelops the rod-like stream R of water as it projects through the cone 4—4'.

The downstream cone 4—4' projects through a sharp edge metering baffle plate 12—12' which is placed between the gas inlet chamber 6 and the upstream cone 8 of the gas veni-contracta B. The annular passage or opening 13' thus formed is for the purpose of spreading evenly and streamlining the gas flowing to and over the liquid surface and flow with it through the second or gas upstream cone 8 to form another sleeve Y which envelops the laminar stream R—X. By this prevention of gas turbulence, the exhaust gas has the same directional flow as the liquid stream and envelops it entirely without breaking the surface film laminar flow continuity or the laminar streaming because the highly polished smooth interior or wetted surface prevents impact shock with vector formation that would result from rough surfaces.

The gas upstream cone 8 projects into a third upstream cone 37 with a throat 38 through which the two liquids and gas all pass in streamline flow. Still another fluid may be added at this point, admitted through inlet 21, to form a laminar sleeve Z, but such additional fluid is not normally included in producting a fire-suppressing foam. All the fluids are now brought under the same absolute pressure but because of volumetric difference and densities, the dispersion of the gas in bubble formation throughout the streaming water takes place. The formation of the gas spheres originates on and in penetrating the liquid soap film enveloping the water column, under the pressure created by the large volume of the gas entering with the two liquids into the outlet 11 which has exactly the same transverse area as the inlet 1 that was occupied by the water alone.

This means that 16 unit volumes of water and soap liquid meet 100 unit volumes of gas and together traverse through the same cross-sectional area through the fire hose to the discharge nozzle. The expanded hot and contracting gas is forced through the enveloping laminar liquid soap film and into the stream of water without disruption or discontinuity of the water stream which, because of its high velocity mass force, remains in streamline formation. The water stream receives the foam liquid gas-soaked bubbles practically without variation in linear speed, but at different momentum, thus effecting their dispersal and uniform separation. This action effects complete and homogeneous dispersion throughout the water column streaming in laminar flow at high velocity and without vortices or turbulence caused by angular forces or baffles, from entry of the first veni-contracta A to exit from the last veni-contracta B and into the outlet end.

When the diameter of the water column is increased, as required for increased foam volume as from 133 to 266 g. p. m., there may be a fourth or more upstream cone added to maintain the water column in streamline flow and effect homogeneous dispersion of the soap bubbles in the water to form the emulsion of foam. By adjustment of the inlet 5', the quantity of foam liquid may be varied to produce a foam mixture ranging from a freely running slush-foam to a non-running sponge-foam.

Water from the internal combustion engine's pump enters the upstream cone under high pressure and at high velocity and passes in solid streamline flow, successively through the first, second and third throats of the ventura and emerges into the discharge section on its way to the fire hose nozzle from which the water now in colloidal state emerges in streamline flow and is projected a great distance in circular unbroken continuity.

The velocity of the water is increased greatly in streaming through the first throat and this reduces the absolute pressure there to very low. As a result, a soap-liquid is caused to enter and meet the water directly at the throat, entering through orifices equally spaced around the channel circumscribing the throat or a circumferential annular channel. The soap liquid does not enter the water, because of its very high velocity and streaming continuity, but as the soap liquid, at lower velocity, meets the water it is swept forward and is spread over the entire water circumferential area, forming a viscous liquid soap envelope moving forward with the water and it is also in streamline forward flow.

The now completely film-enveloped water and enveloping soap liquid together flow at high velocity through the second veni-contracta throat. Here again the absolute pressure is made very low which causes the gas final combustion products from the engine to enter, being led by a suitable pipe to the exhaust gas inlet in the gas cone chamber.

The exhaust gas on leaving the engine is normally at very high temperature and above atmospheric absolute pressure; however, the directional gas flow is to the place of its lowest absolute pressure which is at the second throat and this is placed after the directional plate-chambers through which the exhaust gas flows in parallel streamline with the water and liquid soap film enveloping both the foam-forming liquid and the water stream. During this first contact with the soap-film the hot gas is not cooled and is under a slightly decreasing pressure both of which prevents a material change in volume but causes the higher velocity gas and adhering foam-forming liquid to adhere together as the gas is forced into the water through the liquid soap enveloping film by the increased pressure that follows the emergence of the three streaming fluids together from the third veni-contracta throat into the discharge end. The hose-line then contains the compressed hot gas bubbles within parallel walls until the fire nozzle is reached. The water is forced under its very great velocity-head-pressure from the nozzle in streamline flow, carrying the exhaust gas bubbles in mixed suspension with a gas density greater than the surrounding atmospheric air. The bubbles have a surface tension greater than air formed foam together with a value of $k$, the thermal conductivity of the exhaust gas being only 0.0181 as compared with 0.0265 for air.

The water is under forced high pressure from its entry into the first upstream cone high-velocity head pressure until it leaves the fire nozzle. The velocity of the water is so great that it remains in streamline flow of circular transverse section without turbulence or circumferential "splintering" and very slight angular divergence until through the third throat in which the gas film, in contact with the soap-liquid film, is slowed to attain the same velocity which is the velocity of the water.

In forced contact together all at high initial velocity due to the differential low absolute pressure in which each exerts the force $$F = \frac{MV^2}{g}$$

applies to each liquid and the gas, but W, which is the specific weight of unit volume, is different, i. e. the density of the three fluids is different and varies widely. Maintaining its streamline flow slower than the gas velocity because of its greater density the gas film adhering to the soap liquid is broken and shattered into very small bubbles; these are then dispersed by the resultant different velocity momentum forces into the water stream.

The gas is at very high temperature at the time of disruption on the soap liquid to which it adheres. The exhaust gas bubbles, as formed and covered by the soap liquid film, are forced into and dispersed through the streaming water. During this dispersal, the gas bubbles have their volume decreased only slightly by being cooled by the water, the time factor of the contact being too short to effect the temperature of the water as it is limited to 0.0009 hr. During any contracting process, the soap liquid film covering the gas-spheres is thickened, thereby increasing the surface tension and contracting force exerted on each gas sphere. The resultant effect is that each bubble dispersed through the water stream has its density increased to such an extent that after projection in the water stream a distance of 100 ft. or more, at its very high temperature to the place of conflagration, it is heavier than atmospheric air through which it is projected, and causes the hot-gas bubble blanket to lie on and continue to contract in volume as it cools and not ascend from the surface upon which it has been thrown and over which it has spread.

By the concentric streamline high velocity differential flow, with the coldest liquid forming a core in the center and having the highest density and the hot exhaust gas at the outer circumference with the least density and highest temperature, the concentration of mechanical foam-forming liquid per unit area of bubble surface is greater, thereby making the bubbles in the foam more stable both to heat and decreased pressure.

This method results in the attainment of uniform dispersion of a gas and of a liquid throughout another liquid by, first, enveloping, without impact shock or turbulence, in successive film layers, each fluid as it is admitted at high velocity, and directed and maintained in streamline forward and (180°—3°) parallel flow i. e. without vector forces causing angular disruption or discontinuity in the fluids to be dispersed or colloidalized into a homogenized state. Secondly, after each fluid annulus formed sleeve successively surrounds the actuating central liquid core, while all are moving in the same direction in absolutely parallel (±3°) and streamline flow but each at a different very high velocity relative to the other, there will be created, at each interface surface (gas to foam-forming liquid, foam-forming liquid to water), rotational motion within the contacting surfaces as the faster moving surface draws with it the film adhering to it. This non-vector, but only by parallel flow force movement, creates a rotative movement, which in the foam-forming liquid is counter-clockwise at the highest velocity or water surface, and clockwise in the foam-forming liquid at the gas face; but the rotational speeds are different due to difference in flow velocity, density adherence and viscosity. And third, only the liquid water stream maintains a constant forward velocity passing through each successive Venturi throat without touching the metal surface thereof. But the velocity of the foam-liquid and the gas have their actual and relative velocities successively changed, greatly increased in each upstream cone and decreased after the throat. Therefore at no time are these velocities constant relative to each other or the water stream before attaining the outlet end. Variable high velocity rotational film movement, caused by high velocity linear flow under successive variable gas-pressure heads, forces the gas into bubble formation and dispersal through the high velocity water stream in which the gas bubbles are projected from the dihydro colloidal projector.

Another use of the device, and process encompassed by the invention resides in soil fertilization by colloidalized fertilizer and foam providing artificial snow-blanketing effects equal and better than natural. Greatly improved soil fertilization may be obtained by colloidal projected air fertilized foam made with liquid fertilizing agents suitable for the particular soil, such as slaked lime, phosphate, potash and other soil foods either alone or in suitable mixtures. Because, by this method of securing colloidal dispersion of the fertilizing agents with the air-aspirated, the very high oxygen content of the surface water is reduced by the pressure drop and is replaced by an equivalent volume of nitrogen received directly from the aspirated air. And when a protein base foamforming liquid (liquid soap formed from fats and oils) is used, the fertilizing air from colloidalized bubbles cover the soil, preventing "quick drying-out," and enabling the higher nitrogenized water with both suspended and soluble fertilizing material to penetrate deeper without loss by evaporation. This longer time period secured for deep penetration of the carbon dioxide contained in the air-foam blanket by direct contact with the air carried into the earth with the bubbles is a reproduction of nature in effect to that equivalent to slow long-continued natural rain or winter snow.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. A device for forming a colloidal mixture in a high velocity fluid stream without materially affecting the velocity thereof, which device comprises two Venturi-like tube portions in axial alignment, each of said tube portions having upstream and downstream cones contracting to an intermediate throat, one of said tube portions having an axial inlet for the high velocity fluid and opening into the upstream cone for contraction of the fluid through the throat thereof to produce a rod-like stream of fluid, the other of said tube portions having an axial outlet opening from the downstream cone thereof, the forward edge portion of the upstream cone of said outlet tube portion surrounding the trailing edge of the downstream cone of said inlet tube portion to receive the high velocity rod-like stream of fluid therefrom, and an auxiliary inlet for each of said tube portions for the admission of other fluids to surround said rod-like stream before passage through said outlet, the auxiliary inlet for said inlet tube portion opening into the throat thereof, and the auxiliary inlet for said outlet tube portion opening into the upstream cone thereof and between said upstream cone and the downstream cone of said inlet tube portion.

2. A device as defined in claim 1 wherein the auxiliary inlet for said inlet tube portion opens annularly into the downstream cone of said inlet tube portion immediately adjacent the throat of said portion.

3. A device as defined in claim 1 wherein an annular baffle is spaced from said downstream cone of the inlet tube portion to circumferentially distribute and streamline the flow of fluid through the inlet.

4. A device as defined in claim 1 wherein the inlet tube portion is formed in two parts, the primary of said parts including the axial inlet, upstream cone and throat with an internally threaded recess surrounding said throat and an inlet into the bottom of said recess, the secondary of said parts including the downstream cone and having external threads for adjustable insertion into said recess to define a selectively variable annular auxiliary inlet between said throat and said downstream cone.

5. A device as defined in claim 1 wherein the inlet tube portion is formed in two parts, the primary of said parts including the axial inlet, upstream cone and throat with an internally threaded recess surrounding said throat and an inlet into the bottom of said recess, the secondary of said parts including the downstream cone and having external threads for adjustable insertion into said recess to define a selectively variable annular auxiliary inlet between said throat and said downstream cone, said secondary part including means for rotating said part to thread it relative to said recess, and manually operable means extending through said primary part for actuating said rotating means.

6. A device as defined in claim 1 wherein said outlet tube portion comprising a first upstream cone open to the downstream cone of said inlet tube portion, and contracting to a terminal throat, a second upstream cone surrounding said terminal throat and contracting to a second throat which extends to the downstream cone, and another auxiliary inlet opening into said second upstream cone exteriorly of said first upstream cone and terminal throat.

7. A device as defined in claim 1 wherein said outlet tube portion comprises a first upstream cone open to the downstream cone of said inlet tube portion, and contracting to a terminal throat, a second upstream cone surrounding said terminal throat and contracting to a second throat which extends to the downstream cone, and another auxiliary inlet opening into said second upstream cone exteriorly of said first upstream cone and terminal throat, said second throat and downstream cone being dimensioned relative to said terminal throat to define a streamlined phantom downstream cone for said terminal throat.

8. A multi-throat Venturi disperser for a water, foam mixture, comprising a body portion having an integral hyperboloid formed inlet section, a substantially cone-shaped throat integral with said body portion receiving the discharge of said inlet portion, the enlarged end of said throat portion encircling the outlet end of said inlet portion, a second cone-shaped throat portion carried in said body portion and receiving the discharge at its enlarged end from the first throat portion, the enlarged end of said second throat portion surrounding said first throat portion to define a vacuum chamber during operation, the said body portion being formed with a tapered restricted discharge end receiving the discharge from said second throat portion, the hyperboloidal-shaped inlet section being formed at its narrowest portion with a bypass for receiving a soap liquid and a second inlet formed in said body portion on the upstream side of the discharge end of said inlet section for the introduction of a combustion dampening gas whereby the rapid flow of the incoming water draws both the soap liquid and gases into the stream emerging from the outlet end of the disperser.

9. A device as defined in claim 1 wherein said inlet tube portion has an auxiliary outlet adjacent said inlet, a pressure actuated injector connected with the auxiliary inlet in said upstream cone, and a connection between said auxiliary outlet and said injector to supply fluid under pressure from said inlet to said injector and actuate said injector to initiate flow through said auxiliary inlet.

CLINTON ROOT FOUTZ.

REFERENCES CITED

The following references are of record in the file of this patent:

UNITED STATES PATENTS

| Number    | Name      | Date           |
|-----------|-----------|----------------|
| 2,146,605 | Timpson   | Feb. 7, 1939   |
| 2,164,153 | Friedrich | June 27, 1939  |
| 2,198,585 | Urquhart  | Apr. 23, 1940  |
| 2,361,980 | Tyrrell   | Nov. 7, 1944   |